US012336056B2

(12) United States Patent
So

(10) Patent No.: US 12,336,056 B2
(45) Date of Patent: Jun. 17, 2025

(54) METHODS AND SYSTEMS OF USING A PLURALITY OF WIRELESS COMMUNICATION MODULES AT A NETWORK DEVICE WITH ONE SIM CARD

(71) Applicant: Pismo Labs Technology Limited, Kowloon (HK)

(72) Inventor: Chi Kwong So, New Territories (HK)

(73) Assignee: Pismo Labs Technology Limited, Kowloon (HK)

(*) Notice: Subject to any disclaimer, the term of this patent is extended or adjusted under 35 U.S.C. 154(b) by 492 days.

(21) Appl. No.: 17/777,614

(22) PCT Filed: Dec. 31, 2020

(86) PCT No.: PCT/IB2020/062578
§ 371 (c)(1),
(2) Date: May 17, 2022

(87) PCT Pub. No.: WO2022/144577
PCT Pub. Date: Jul. 7, 2022

(65) Prior Publication Data
US 2023/0247412 A1    Aug. 3, 2023

(51) Int. Cl.
*H04W 8/18* (2009.01)
*H04W 8/20* (2009.01)
*H04W 76/15* (2018.01)

(52) U.S. Cl.
CPC ........ *H04W 8/183* (2013.01); *H04W 8/205* (2013.01); *H04W 76/15* (2018.02)

(58) Field of Classification Search
CPC ..... H04W 8/183; H04W 8/205; H04W 76/15; H04W 4/60; H04W 88/06; H04W 12/45; H04W 12/42
See application file for complete search history.

(56) References Cited

U.S. PATENT DOCUMENTS

2013/0329639 A1* 12/2013 Wietfeldt .............. H04W 88/06
                                                         370/328
2015/0373530 A1* 12/2015 Stein .................... H04W 4/60
                                                         455/411

(Continued)

FOREIGN PATENT DOCUMENTS

EP         3099045 A1    11/2016
WO      2018148033 A1     8/2018

OTHER PUBLICATIONS

International Search Report in International Application No. PCT/IB2020/062578, mailed on Sep. 28, 2021.

(Continued)

*Primary Examiner* — Margaret G Webb
(74) *Attorney, Agent, or Firm* — Hershkovitz & Associates, PLLC; Abe Hershkovitz

(57) ABSTRACT

The present invention discloses a method and system for sending data to and receiving data from a cellular network at a network device. Network device may establish a first cellular connection by using a first wireless communication module (WCM) and a first local Subscriber Identification Module (SIM). After a first data connection is established with the SIM bank via the first cellular connection, a first SIM profile is downloaded from the SIM bank. A second cellular connection is established by using a second WCM and the first SIM profile. After a second data connection is established with the SIM bank via the second cellular connection, disconnecting the first cellular connection. Finally, establishing a third cellular connection by using a third WCM and the first local SIM, and establishing a third data connection with the SIM bank.

20 Claims, 16 Drawing Sheets

(56) References Cited

U.S. PATENT DOCUMENTS

| | | |
|---|---|---|
| 2016/0353274 A1 | 12/2016 | Chichierchia |
| 2018/0014178 A1 | 1/2018 | Baek et al. |
| 2018/0234787 A1 | 8/2018 | Karimli et al. |
| 2019/0327591 A1 | 10/2019 | Karimli et al. |
| 2020/0178070 A1 | 6/2020 | Yang et al. |
| 2020/0186237 A1* | 6/2020 | Karlsson ............... H04W 84/06 |
| 2020/0296574 A1 | 9/2020 | Baek et al. |
| 2021/0120424 A1* | 4/2021 | Kang ...................... H04L 67/30 |

OTHER PUBLICATIONS

Written Opinion of the International Search Authority in International Application No. PCT/IB2020/062578, mailed on Sep. 28, 2021.

* cited by examiner

METHODS AND SYSTEMS OF USING A PLURALITY OF WIRELESS COMMUNICATION MODULES AT A NETWORK DEVICE WITH ONE SIM CARD

TECHNICAL FIELD

The present disclosure relates in general to the field of computer networks. More particularly, the present disclosure relates to network devices that use two wireless communication modules sending data to and receiving data from a cellular network.

BACKGROUND ART

A network device, such as a cellular router, provides communication services to other devices. The network device may establish a wireless carrier connection and then allow the other devices to send and receive data over the wireless carrier connection. In order to establish wireless carrier connections, one or more subscriber identity module (SIM) cards are used.

When the network device moves to another location, a different SIM card may be required. Further, when the data quota of a SIM card is used up or about to be used up, another different SIM card may be swapped with the SIM card. Also, when a SIM card is out-of-order, a new SIM will be required to replace the SIM card. There is a myriad of reasons why a SIM card may need to be replaced at the network device.

One of the solutions is to use a remote SIM. The remote SIM is placed at the SIM bank. The network device communicates with the SIM bank over a logic data connection in order to use the remote SIM, and the logical data connection is established over the already established wireless carrier connection.

SUMMARY OF INVENTION

The present invention provides a method for allowing a user of a network device to access the network by using two wireless communication modules, comprising the steps of: establishing a first cellular connection by using a first wireless communication module (WCM) and a first local SIM; establishing a first data connection with a SIM bank via the first cellular connection; downloading a first SIM profile from the SIM bank; establishing a second cellular connection by using a second WCM and the first SIM profile; establishing a second data connection with the SIM bank via the second cellular connection; disconnecting the first cellular connection; establishing a third cellular connection by using a third WCM and the first local SIM, and establishing a third data connection with the SIM bank.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 3D is another network diagram according to the embodiments of the present disclosure;

DESCRIPTION OF EMBODIMENTS

Figure 1A:
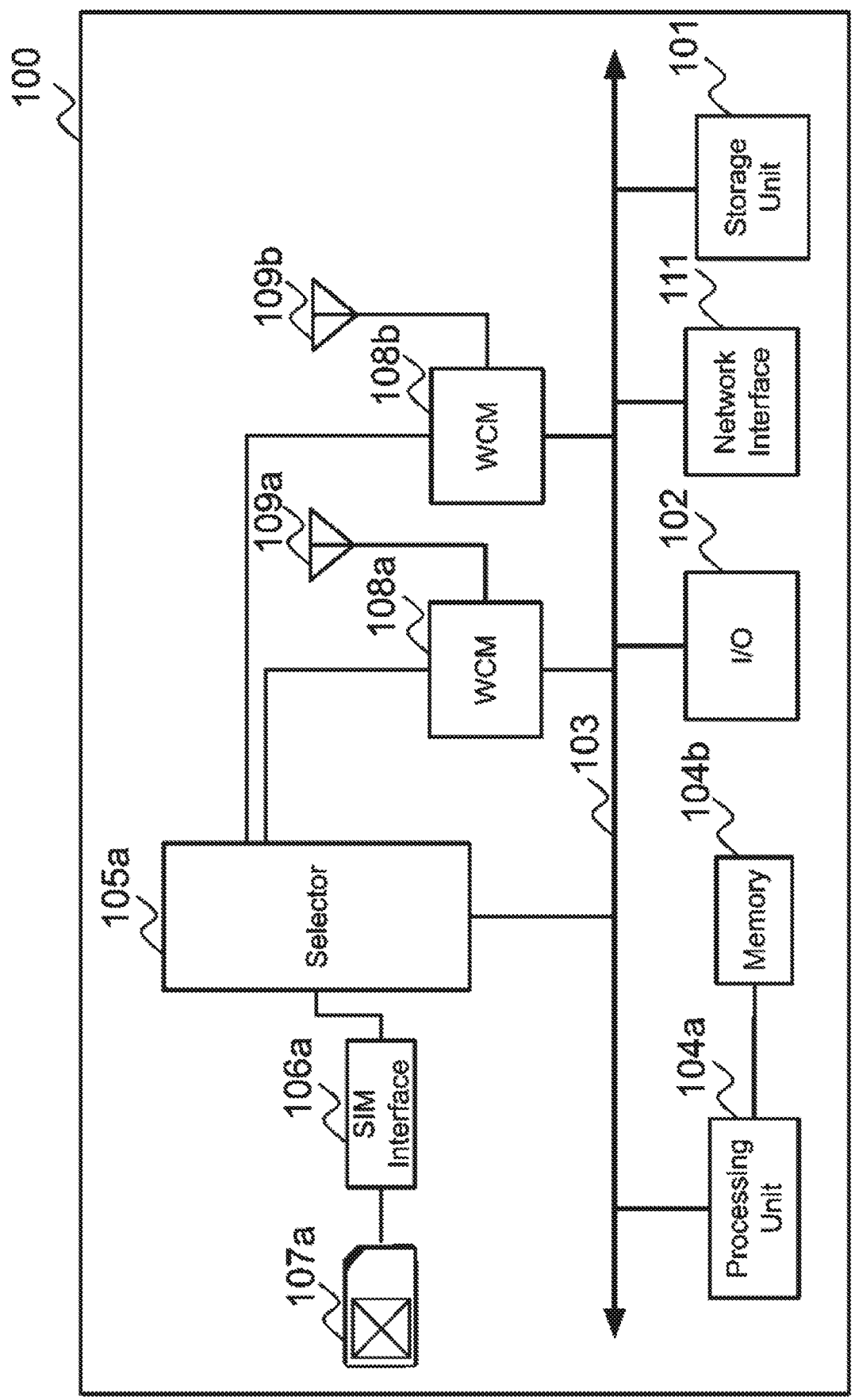
FIG. 1A is a block diagram illustrating a network device according to the embodiments of the present disclosure.

The ensuing description provides preferred exemplary embodiment(s) only and is not intended to limit the scope, applicability, or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Specific details are given in the following description to provide a thorough understanding of the embodiments. However, it may be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc.

When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information.

The term "machine-readable medium" includes but is not limited to portable or fixed storage devices, optical storage devices, wireless channels, and various other mediums capable of storing, containing, or carrying instruction(s) and/or data. A machine-readable medium can be realized by virtualization and can be a virtual machine-readable medium, including a virtual machine-readable medium in a cloud-based instance. Furthermore, embodiments may be implemented by hardware, software, firmware, middleware, microcode, hardware description, languages, or any combination thereof. When implemented in software, firmware, middleware, or microcode, the program code or code segments to perform the necessary tasks may be stored in a machine-readable medium such as a storage medium.

The term computer-readable medium, main memory, secondary storage, or storage medium as used herein refers to any medium that participates in providing instructions to a processing unit for execution. The processing unit reads the data written in the primary storage medium and writes the data in the secondary storage medium. Therefore, even if the data written in the primary storage medium is lost due to a momentary power failure and the like, the data can be restored by transferring the data held in the secondary storage medium to the primary storage medium. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile storage includes dynamic memory. Transmission media includes coaxial cables, copper wire, and fiber optics. Transmission media can also take the form of acoustic or light waves, such as those generated during radio-wave and infrared data communications.

Volatile storage may be used for storing temporary variables or other intermediate information during the execution of instructions by a processing unit. Non-volatile storage or static storage may be used for storing static information and instructions for the processor, as well as various system configuration parameters.

The storage medium may include a number of software modules that may be implemented as software codes to be executed by the processing unit using any suitable computer instruction type. The software code may be stored as a series of instructions or commands or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a computer-readable storage medium. A processing unit(s) can be realized by virtualization and can be a virtual processing unit(s), including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

Alternatively, hardware circuitry may be used in place of, or in combination with, software instructions to implement processes consistent with the principles of the invention. Thus, implementations consistent with the principles of the invention are not limited to any specific combination of hardware circuitry and software.

A network interface may be implemented by a standalone electronic component or may be integrated with other electronic components. A network interface may have no network connection or at least one network connection depending on the configuration. A network interface, such as network interfaces 111, in network device 100 or network device 110 may be an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE™), WiMAX™, General packet radio service (GPRS), Global System for Mobile Communications (GSM™), Enhanced Data rates for GSM Evolution (EDGE), Code division multiple access (CDMA), Wi-Fi™, CDMA2000, Wideband CDMA (WCDMA), Time Division CDMA (TD-SCDMA), Bluetooth™, WiBro, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

As disclosed herein, the term "wireless communication module" may represent a transceiver module to provide network capabilities to a power controller or power controller server using 3G, GPRS, or GPS modules, through wires or through an Ethernet cable. The wireless communication module lowers a processing unit to obtain user information, and the communications port of the wireless communication module can connect to a personal computer or other power controller or power controller server (PCS) through wires or wirelessly by using a serial bus or Ethernet or using 2G/3G/4G or LTE™ technology. The wireless communication module can be used as a network interface for applications that require data to be shared between a power controller and an intelligent device such as a host computer and/or a server.

SIM Bank and Management Server

Figure 4A:
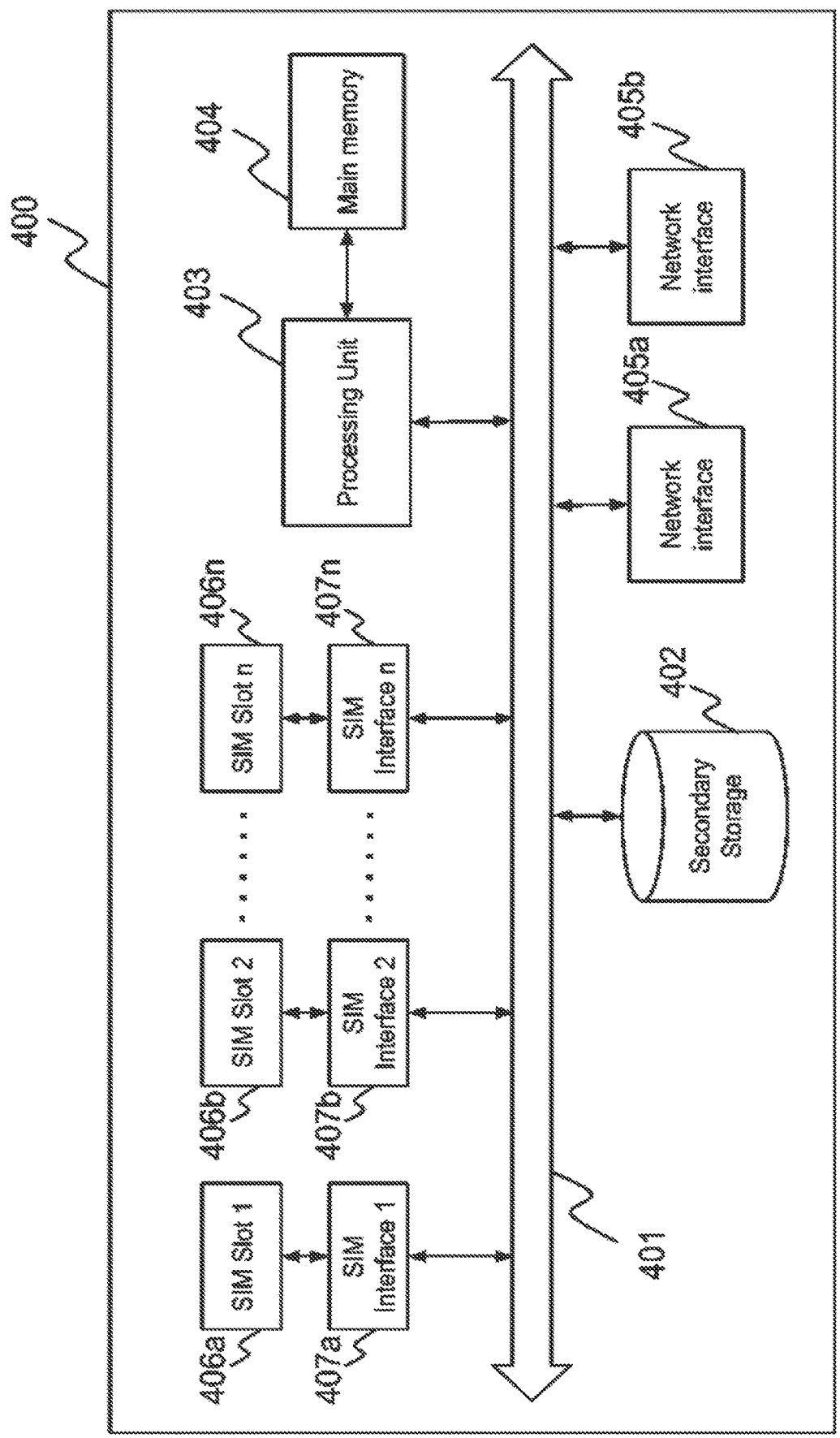
FIG. 4A is a block diagram illustrating a SIM bank according to the embodiments of the present disclosure.

FIG. 4A is a schematic block diagram of an exemplary Subscriber Identification Module (SIM) bank according to the embodiments of the present invention. For example, the exemplary SIM bank is SIM bank 400. SIM bank 400 comprises at least one processing unit 403 and at least one main memory 404. Processing unit 403 may be connected to main memory 404 directly and with other hardware components, for example, with at least one secondary storage 402, one or more network interface 405, and a plurality of SIM interfaces 407, through a system bus, such as system bus 401. System bus 401 may be any of several types of bus structures, including a memory bus, a peripheral bus, or a local bus using any of a variety of bus architecture. Each of the plurality of SIM interfaces 407 may be connected to a corresponding SIM slot, such as SIM slot 406 to place or to connect to a SIM. Processing unit 403 may receive authentication requests from a network device and return authentication information, such as signed response (SRES), to the network device.

A SIM interface, such as SIM interfaces 407a, is used to access and write information to and from a SIM. There are many SIM interfaces available from different manufacturers. Some of the SIM interfaces provide functions of power supply, card reset signal, card clock signal, and data exchange. Data exchange may be performed between the SIM and processing unit 403 through the SIM interfaces. Some of the SIM interfaces may only be connected to one SIM, while some may be connected to a plurality of SIMs.

In one variant, hardware components such as secondary storage 402, network interfaces 405a and 405b, and SIM interfaces 407a-n may be directly connected to processing unit 403 when the processing unit has an adequate number of I/O pins. System bus 407 may be omitted. Alternatively, when processing unit 153 does not have an adequate number of I/O pins, some or all of the hardware components may be connected to the processing unit using one or more CPLDs. There is no limitation that CPLDs must be used. Multiplexers, FPGAs, or any logic circuits which serve the purpose of providing the required number of I/O pins may also be used.

Figure 3A:
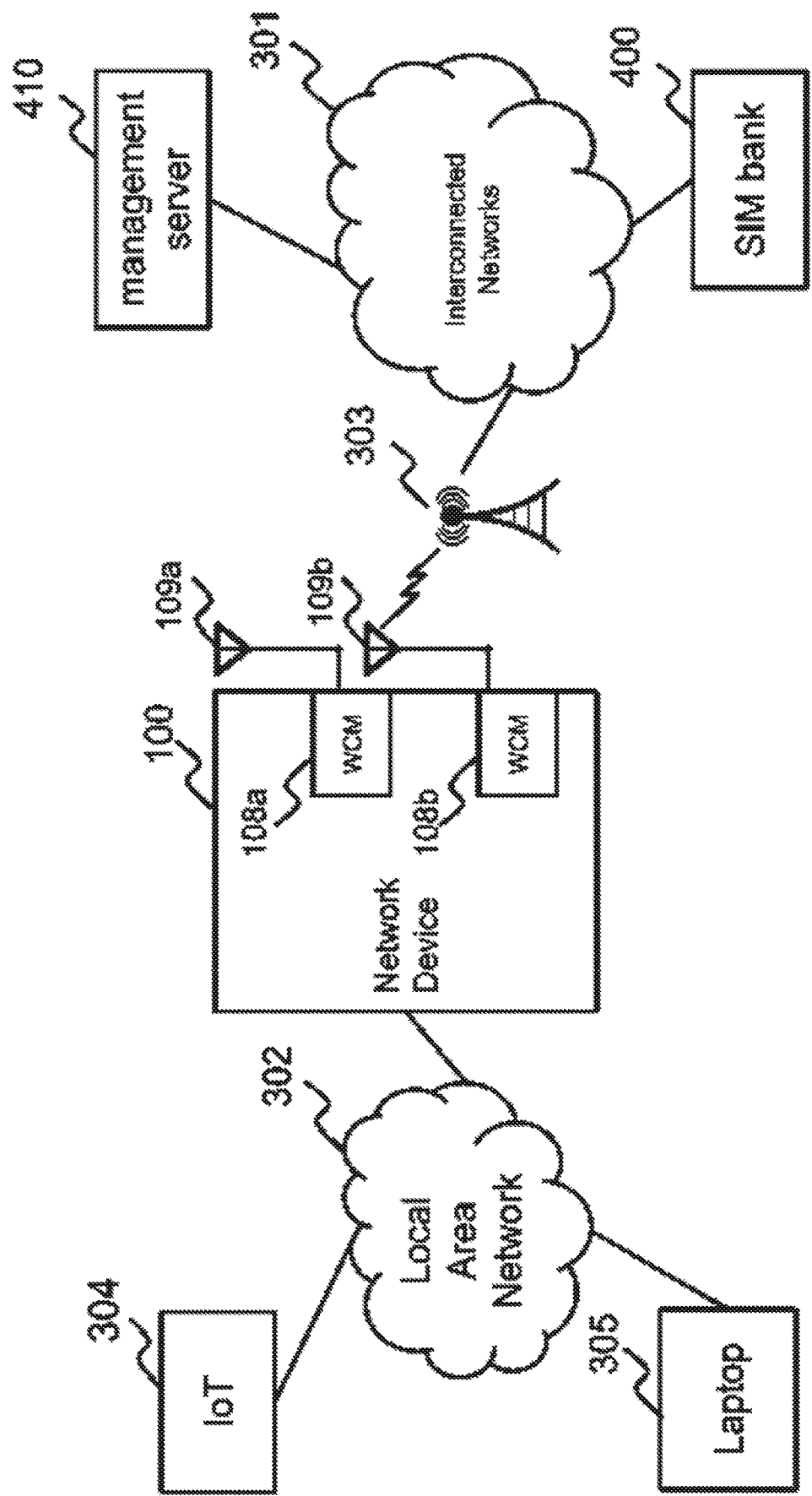
FIG. 3A is a network diagram according to the embodiments of the present disclosure.

The one or more SIM bank(s) may be managed by one or more SIM bank management server(s). For example, one management server 410 is shown in FIG. 3A. Management server 410 may be remotely or locally coupled to the SIM bank 400. Data connection of network device 100 to SIM bank 400 may be managed through a SIM bank management server, for example, management server 410 shown in FIG. 3A. There is no limitation that the SIM bank and the SIM bank management server must be separated. A device may comprise a SIM bank and a SIM bank management server together.

Management server 410 may perform a device authentication procedure before providing access to network device 100 to any of the SIM banks. For availing the device authentication information, network device 100 may need to be registered with management server 410. The registration may be performed online, such as through a user interface (e.g., web page or web form) or offline. The authentication information to authenticate network device 100 may be duly provided by network device 100 or by an administrator of network device 100 to management server 410. Management server 410 may store necessary information including, but not limited to, network device information, administrator information, registration information, authentication information, number of SIM banks connected, SIM banks' location, and information of SIMs placed in the SIM banks.

Figure 4B:
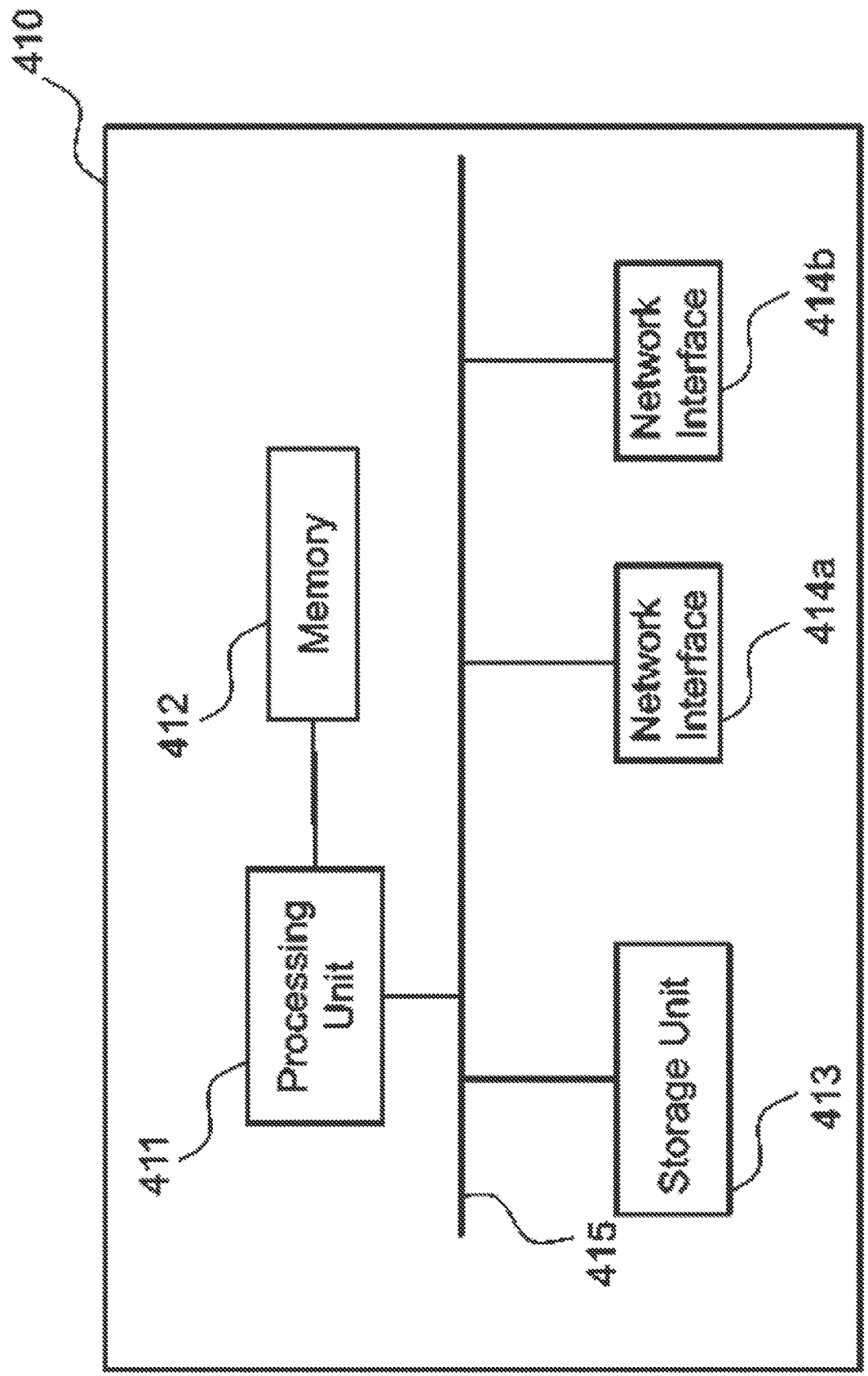
FIG. 4B is a block diagram illustrating a SIM bank management server according to the embodiments of the present disclosure.

FIG. 4B is a schematic block diagram of an exemplary SIM bank management server shown in FIG. 3A. Management server 410 comprises at least one processing unit 411 and at least one main memory 412. Processing unit 411 may be connected to main memory 412 directly and with other components, for example, with at least one storage unit 413 and one or more network interfaces 414a and 414b, through system bus 415. System bus 415 may be any of several types of bus structures, including a memory bus, a peripheral bus, or a local bus using any of a variety of bus architecture.

Network Device with two WCMs and a Local SIM

FIG. 3A is a network diagram of an illustrative network according to the embodiments of the present invention. The network includes network device 100 with antennas 109a and 109b. Only one of them is available to establish a cellular connection with base station 303 at one time. Network device 100 may use the established cellular connection as a wide area network (WAN) connection. Network device 100 is also connected to IoT device 304 and laptop 305 through LAN 302, such as Ethernet and Wi-Fi™. SIM bank 400 and management server 410 are connected to interconnected networks 301.

FIG. 1A is a schematic block diagram of an exemplary network device according to the embodiments of the present invention. FIG. 1A should be viewed in conjunction with FIG. 2A, FIG. 3A and FIG. 5A. Network device 100 comprises at least one storage unit 101, at least one I/O interface 102, at least one memory 104b, at least one processing unit 104a, at least one network interface 111, selector 105a, local SIM interface 106a and two wireless communication modules (WCMs) 108a and 108b with corresponding antennas 109a and 109b. Processing unit 104a is connected to memory 104b. Processing unit 401 is connected to storage unit 101, I/O interface 102, selector 105 and WCMs 108a and 108b via bus 103. Local SIM interface 106a is capable of housing a SIM card, such as local SIM 107a. Local SIM 107a may be a physical SIM card or an embedded SIM (eSIM). Details of selector 105 will be discussed in FIG. 2A. Storage unit 101 may contain computer program instructions that processing unit 401 executes in order to implement one or more aspects of the present disclosure. Network device 100, as shown in FIG. 1A, may be a router, a gateway, an access point, computer, server, open system interconnection (OSI) layer three switch, or other devices that reside within the network. Each of antenna 109*a-c* may be a multiple-input multiple-output (MIMO) antenna.

Network device 100 may have a chassis box. Processing unit 104*a* and storage unit 101 are soldered on a circuit board inside the chassis box.

Antennas 109*a* and 109*b* may be embedded within network device 100. Optionally, antennas 109*a* and 109*b* may be the antennas external to the enclosed housing of network device 100.

Figure 2A:
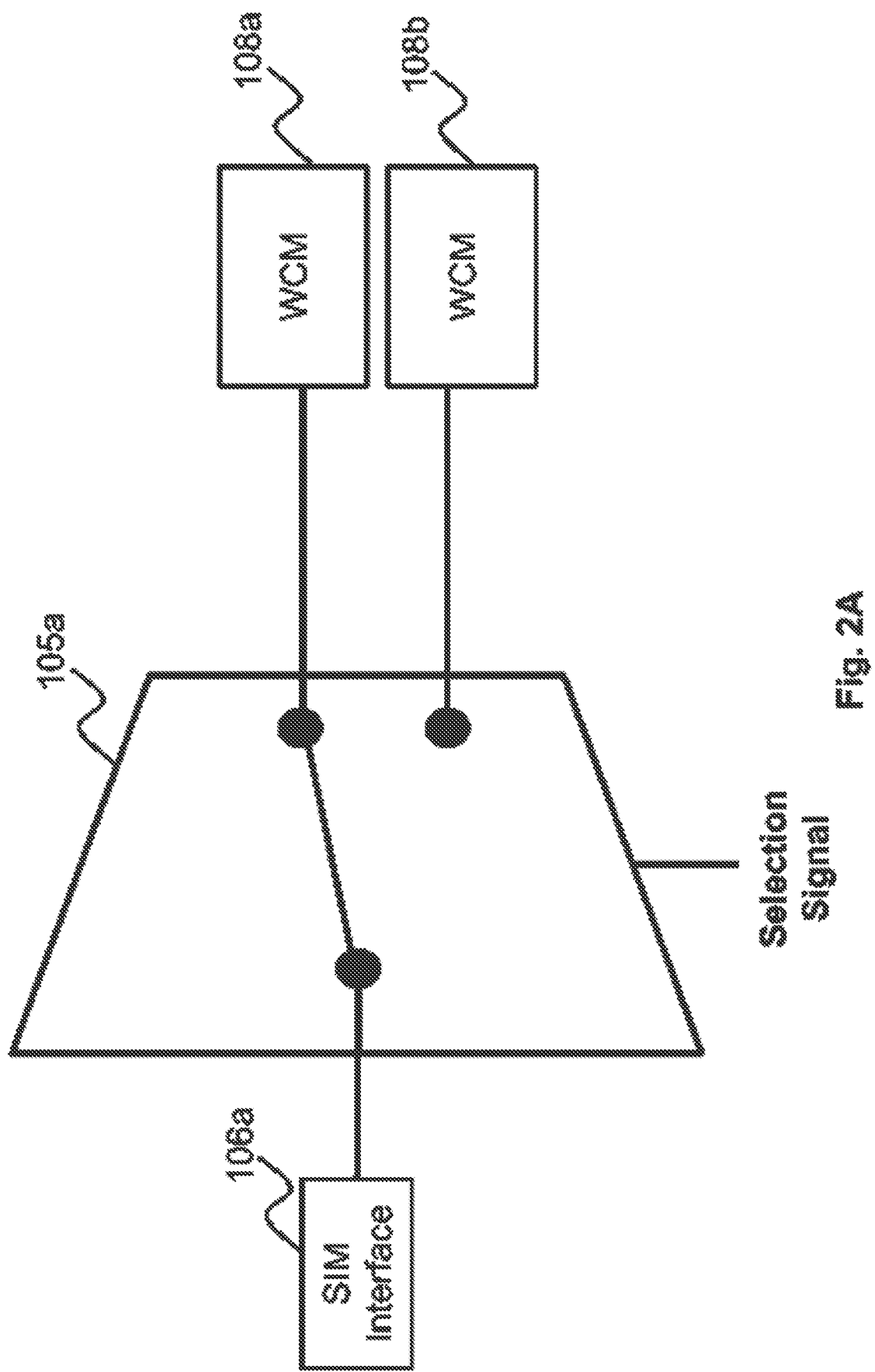
FIG. 2A is a block diagram illustrating a selector according to the embodiments of the present disclosure.

FIG. 2A is a schematic block diagram of an exemplary selector according to the embodiments of the present invention. A selection signal to selector 105*a* is provided by processing unit 104*a* for selecting a WCM from WCMs 108*a* and 108*b*. The selected WCM is configured with a local SIM, such as local SIM 107*a* housed in local SIM interface 106*a* as illustrated in FIG. 1A. Selector 105*a* may be a multiplexer. There are no limitations that a multiplexer must be used. Any logic circuit configurable to realize multiplexing may be used. For example, an FPGA may also be used. In one variant, the selection signal to selector 105*a* is provided via bus 103.

Figure 5A:
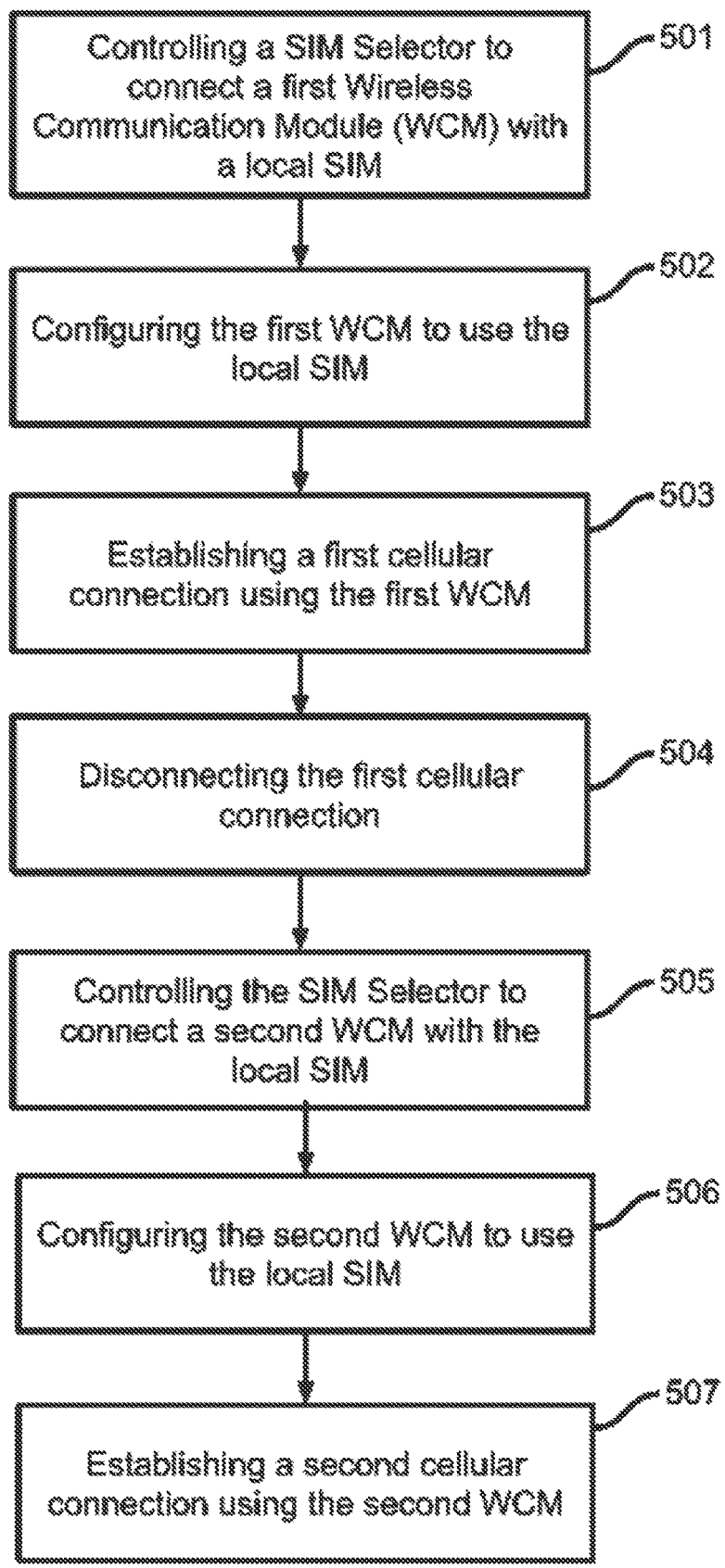
FIG. 5A is a flowchart illustrating processes of one of the embodiments of the present disclosure.

FIG. 5A illustrates the method for establishing a first cellular connection and a second cellular connection using a local SIM through the first WCM and the second WCM, respectively. FIG. 5A should be viewed in conjunction with FIG. 1A, FIG. 2A, and FIG. 3A.

In process 501, processing unit 104*a* controls selector 105*a* to connect WCM 108*a* with local SIM 107*a*.

In process 502, WCM 108*a* is configured to use local SIM 107*a* via selector 105*a* and local SIM interface 106*a*.

In process 503, processing unit 104*a* then instructs WCM 108*a* to establish a first cellular connection. The first cellular connection is established between network device 100 and a base station, such as base station 303. Base Station 303 is connected to WCM 108*a* using authentication information retrieved from local SIM 107*a*. WCM 108*a* may then establish a first data connection to a host reachable through interconnected networks 301 and through base station 303.

In process 504, the first cellular connection is disconnected. Processing unit 104*a* may send a signal or an instruction to WCM 108*a* to disconnect the first cellular connection. When WCM 108*a* receives a signal or an instruction from processing unit 104*a*, WCM 108*a* may then stop using local SIM 107*a*. When the first cellular connection is disconnected, the first data connection established via the first cellular connection may also be disconnected.

In one variant, the processing unit 104*a* may send a selection signal to selector 105*a* to disconnect local SIM 107*a* with WCM 108*a*. As WCM 108*a* is not able to provide authentication information to base station 303 from local SIM 107*a* anymore, the first cellular connection may no longer be maintained and may be disconnected.

In process 505, processing unit 104*a* controls selector 105*a* to connect a second WCM, such as WCM 108*b*, with local SIM 107*a*.

In one variant, process 505 is performed before process 504.

In process 506, WCM 108*b* is configured to use local SIM 107*a*.

In process 507, processing unit 104*a* then instructs WCM 108*b* to establish a second cellular connection. The second cellular connection is established between network device 100 and a base station, which may be the same or different from the base station connected previously. For illustrative purposes, the second cellular connection is established between network device 100 and base station 303. Base Station 303 is connected to WCM 108*b* using authentication information retrieved from local SIM 107*a*. WCM 108*b* may then establish a second data connection to a host reachable through interconnected networks 301 and through base station 303.

Network Device with More than Two WCMs and a Local SIM

In one variant, network device 100 may comprise more than two WCMs, instead of two WCMs illustrated in FIG. 1A.

Figure 3B:
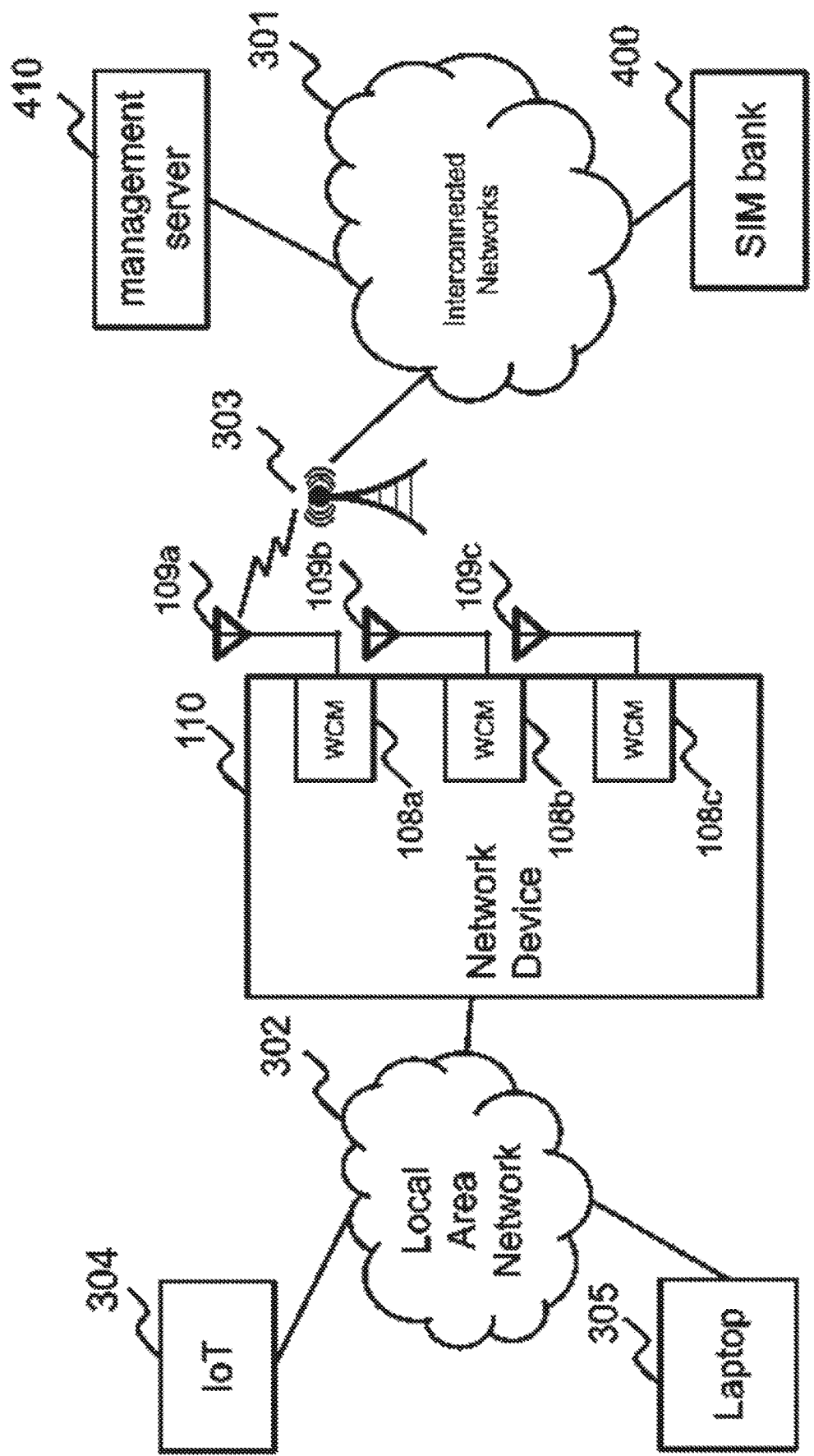
FIG. 3B is another network diagram according to the embodiments of the present disclosure.

FIG. 3B is another network diagram according to the embodiments of the present invention. The network includes network device 110 with antennas 109*a*, 109*b*, and 109*c*. Only one of them is available to establish a cellular connection with base station 303 at one time. FIG. 3B is similar to FIG. 3A except with a different network device and an additional antenna. The difference between network device 100 in FIG. 3A and network device 110 in FIG. 3B will be discussed in FIG. 1B.

Figure 1B:
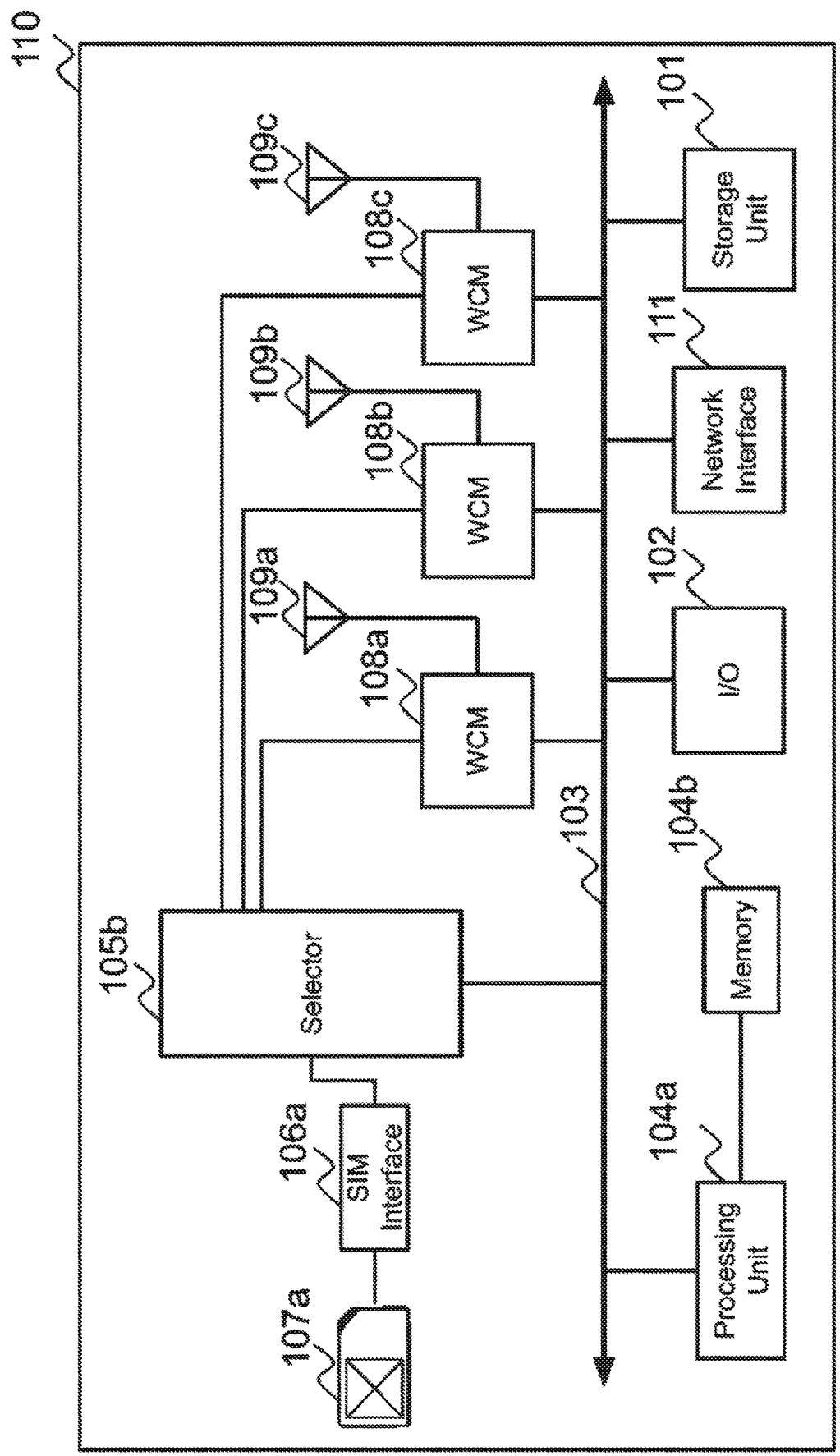
FIG. 1B is a block diagram illustrating another network device according to the embodiments of the present disclosure.

FIG. 1B is a schematic block diagram of another exemplary network device according to the embodiments of the present invention. FIG. 1B is similar to FIG. 1A, but network device 110 illustrated in FIG. 1B further comprises another WCM 108*c* coupled to antenna 109*c*. Also, compared to network device 100, selector 105*a* is replaced by selector 105*b*. Details of selector 105*b* will be discussed in FIG. 2B.

Figure 2B:
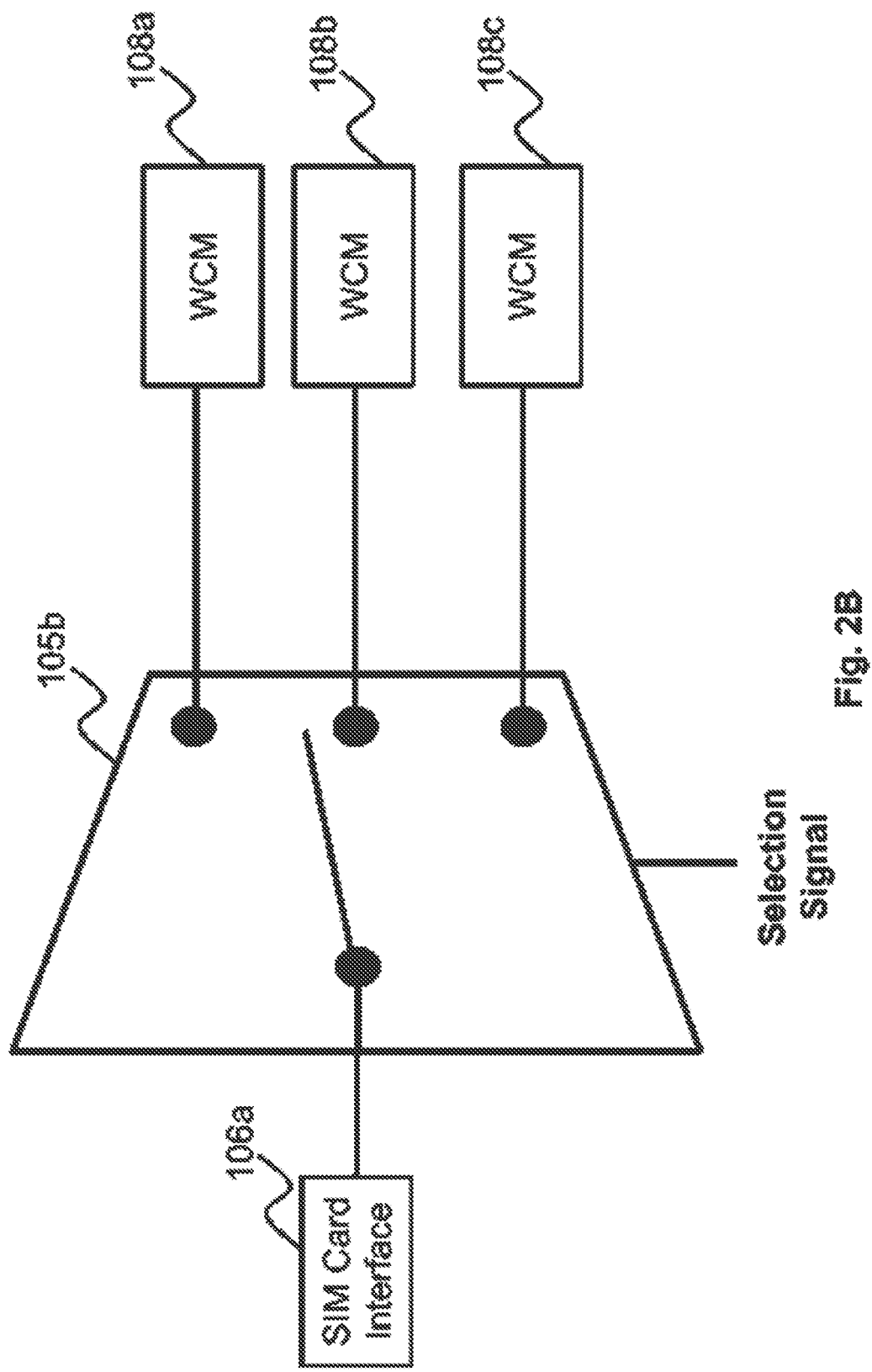
FIG. 2B is a block diagram illustrating another selector according to the embodiments of the present disclosure.

FIG. 2B is another schematic block diagram of an exemplary selector according to the embodiments of the present invention. Selector 105*b* is similar to selector 105*a* but capable of connecting to more than two WCMs. An additional WCM, such as WCM 108*c*, is connected to selector 105*b*. A selection signal to selector 105*b* is provided by processing unit 104*a* to select a WCM from WCMs 108*a*, 108*b*, and 108*c*. The selected WCM is configured with a remote SIM or a local SIM, such as local SIM 107*a* housed in local SIM interface 106*a* illustrated in FIG. 1B. At least one WCM, such as WCM 108*c*, is able to use one or more remote SIM(s) housed in the SIM bank. Each of the one or more remote SIM(s) housed in the SIM bank may be a physical SIM card or an eSIM.

For illustrative purposes, each of WCMs 108*a*, 108*b*, and 108*c* is individually able to establish cellular connections by connecting to a remote SIM housed in SIM bank 400. A SIM profile corresponds to a remote SIM housed in SIM bank 400. Network device 100 may select and download one or more remote SIM based on a remote SIM selection policy. The remote SIM selection policy may be configured by the administrator of network device 100 or retrieved from a remote server. The remote SIM selection policy may be based on one or more of the following criteria: geolocation of the network device, position of SIM placed in the network device, SIM category, network performance history of a SIM, the identity of wireless carrier network issuing a SIM, services offered by wireless carrier network of a SIM, service quality of wireless carrier network of a SIM, administrator's preference, tariffs, remaining usage quota of available local SIM, billing cycle information, and time. The selection may be performed at SIM bank 400 or at network device 100.

A SIM profile contains information that provides access to a specific cellular carrier network for wireless communication, such as an international mobile subscriber identity (IMSI), a mobile country code (MCC), a mobile network code (MNC), and a mobile station identification number (MSIN). SIM bank 400 may be located remotely in the same or different regions (or countries) with network device 110.

Figure 5B:
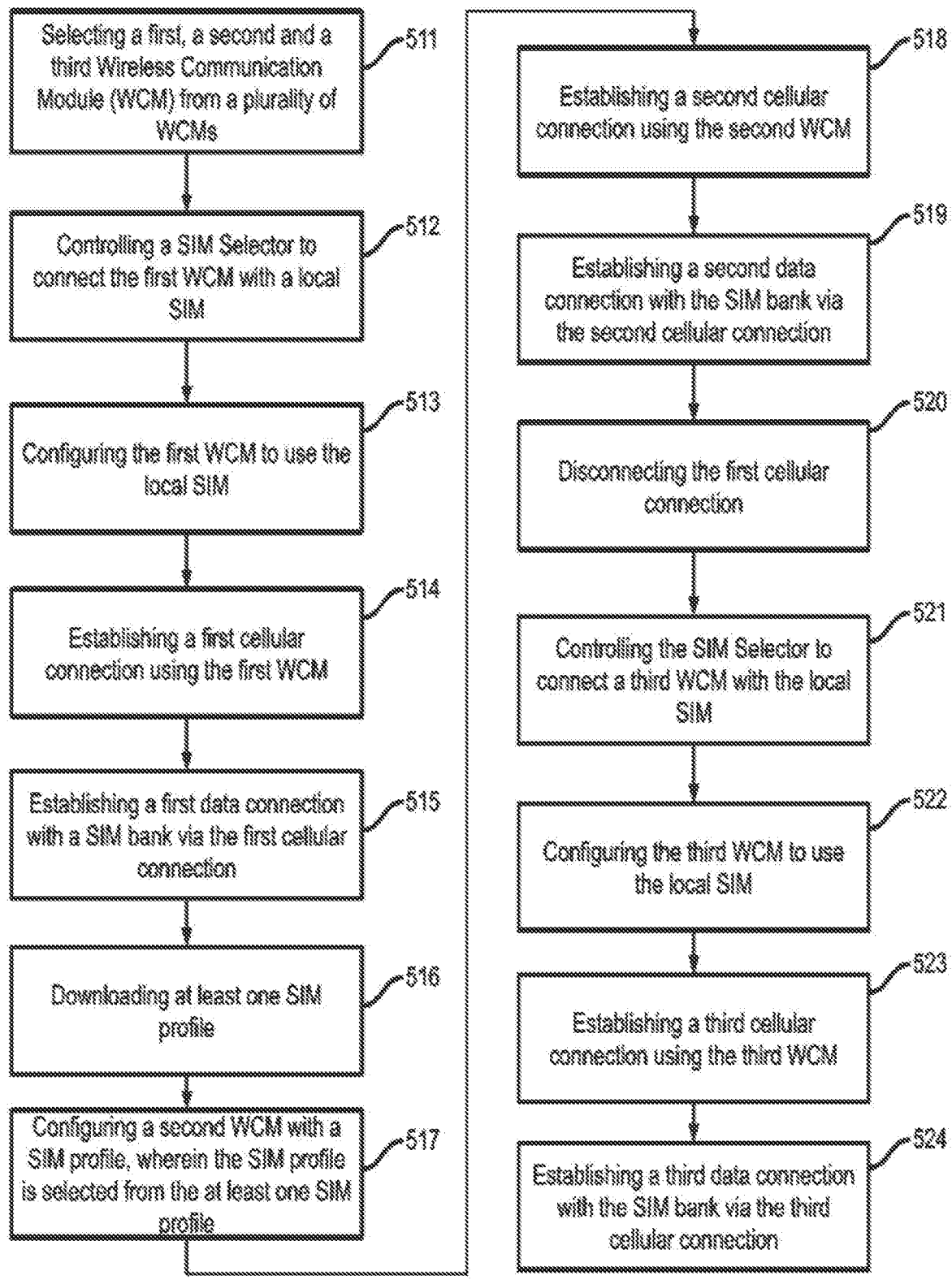
FIG. 5B is a flowchart illustrating processes of one of the embodiments of the present disclosure.

FIG. 5B illustrates the method for establishing three or more cellular connections using a local SIM or a remote SIM. For illustrative purposes, three WCMs 108*a-c* are the WCMs coupled to or housed in network device 110. FIG. 5B should be viewed in conjunction with FIG. 1B, FIG. 2B, and FIG. 3B.

In process 511, network device 110 selects a first WCM, a second WCM, and a third WCM from a plurality of WCMs. For example, WCM 108*a*, WCM 108*b*, and WCM 108*c* are selected as the first WCM, the second WCM, and the third WCM, respectively.

In one variant, the first WCM, the second WCM, or the third WCM may be selected before being used to establish a cellular connection. For example, only WCM 108*a* is selected as the first WCM in process 511. WCM 108*b* is selected as the second WCM before process 517. WCM 108*c* is selected as the third WCM before process 521.

In one variant, the first, the second, and the third WCMs are selected randomly. In another variant, the first, the second, and the third WCM are selected according to the functionalities of the WCMs. For example, the network device may reserve WCMs that are capable of downloading at least one SIM profile and select the remaining WCM as the first WCM.

In process 512, processing unit 104*a* controls selector 105*b* to connect the first WCM, such as WCM 108*a*, with local SIM 107*a*.

In process 513, WCM 108*a* is configured to use local SIM 107*a* via selector 105*b* and local SIM interface 106*a*.

In process 514, processing unit 104*a* then instructs WCM 108*a* to establish a first cellular connection. The first cellular connection is established between network device 110 and a base station, such as base station 303.

In process 515, network device 110 establishes a first data connection with SIM bank 400 via the first cellular connection. Network device 110 is then able to connect and communicate with SIM bank 400 via the first cellular connection. The first data connection is established with SIM bank 400 via the first cellular connection.

Alternatively, the first data connection is established with management server 410 via the first cellular connection. Network device 110 is then able to connect and communicate with management server 410 via the first cellular connection. As it is possible that there is a plurality of SIM banks, management server 410 may select a SIM bank among the plurality of SIM banks. Then management server 410 sends network device 110 the identity of the selected SIM bank, IP address, and authentication information. For example, for illustration purposes only, SIM bank 400 is the selected SIM bank. Network device 110 may then communicate to SIM bank 400 using the IP address and authentication information.

In one variant, the first data connection is established via a connection other than a cellular connection. For example, the first data connection is established using WiFi™.

In process 516, at least one SIM profile is downloaded from SIM bank 400 to network device 110. The number of SIM profiles downloaded may be more than, equal to, or less than the number of WCMs connected to network device 110. A selected SIM profile is selected from a plurality of downloaded SIM profiles according to the remote SIM selection policy.

In process 517, the second WCM, such as WCM 108*b*, is configured to use a selected SIM profile. In one variant, the second WCM is selected from a plurality of WCMs other than the first WCM selected in process 511. In another variant, the second WCM is selected from a plurality of WCMs, including the first WCM selected in process 511.

In process 518, WCM 108*b* is configured to establish a second cellular connection using a selected SIM profile. The selected SIM profile and the local SIM may have the same or different IMSI, MCC, MNC, and/or MSIN.

In process 519, a second data connection is established with SIM bank 400 via the second cellular connection. Network device 110 is then connected, either directly or indirectly, to SIM bank 400.

In process 520, the first cellular connection is disconnected. In one embodiment, network device 110 may check whether at least one data connection is established between network device 110 and SIM bank 400 before disconnecting the first cellular connection. If no cellular connection is established other than the first cellular connection, the first cellular connection is maintained until another cellular connection is established.

In one variant, the first cellular connection is disconnected even if no cellular connection is established with SIM bank 400 other than the first data connection.

In process 521, processing unit 104*a* controls selector 105*b* to connect the third WCM, such as WCM 108*c*, with local SIM 107*a*.

In process 522, WCM 108*c* is configured to use local SIM 107*a*.

In process 523, processing unit 104*a* instructs WCM 108*c* to establish a third cellular connection.

In one variant, network device 110 may further establish a third data connection in process 524. The third data connection is established with the SIM bank via the third cellular connection. Network device 110 is then connected, either directly or indirectly, to SIM bank 400. Network device 110 may maintain the second cellular connection and the third cellular connection.

In another variant, network device 110 may select a cellular connection from the second cellular connection or the third cellular connection such that only one cellular connection is maintained.

Network Device with More than Two WCMs and More than One Local SIMs

Figure 5C:
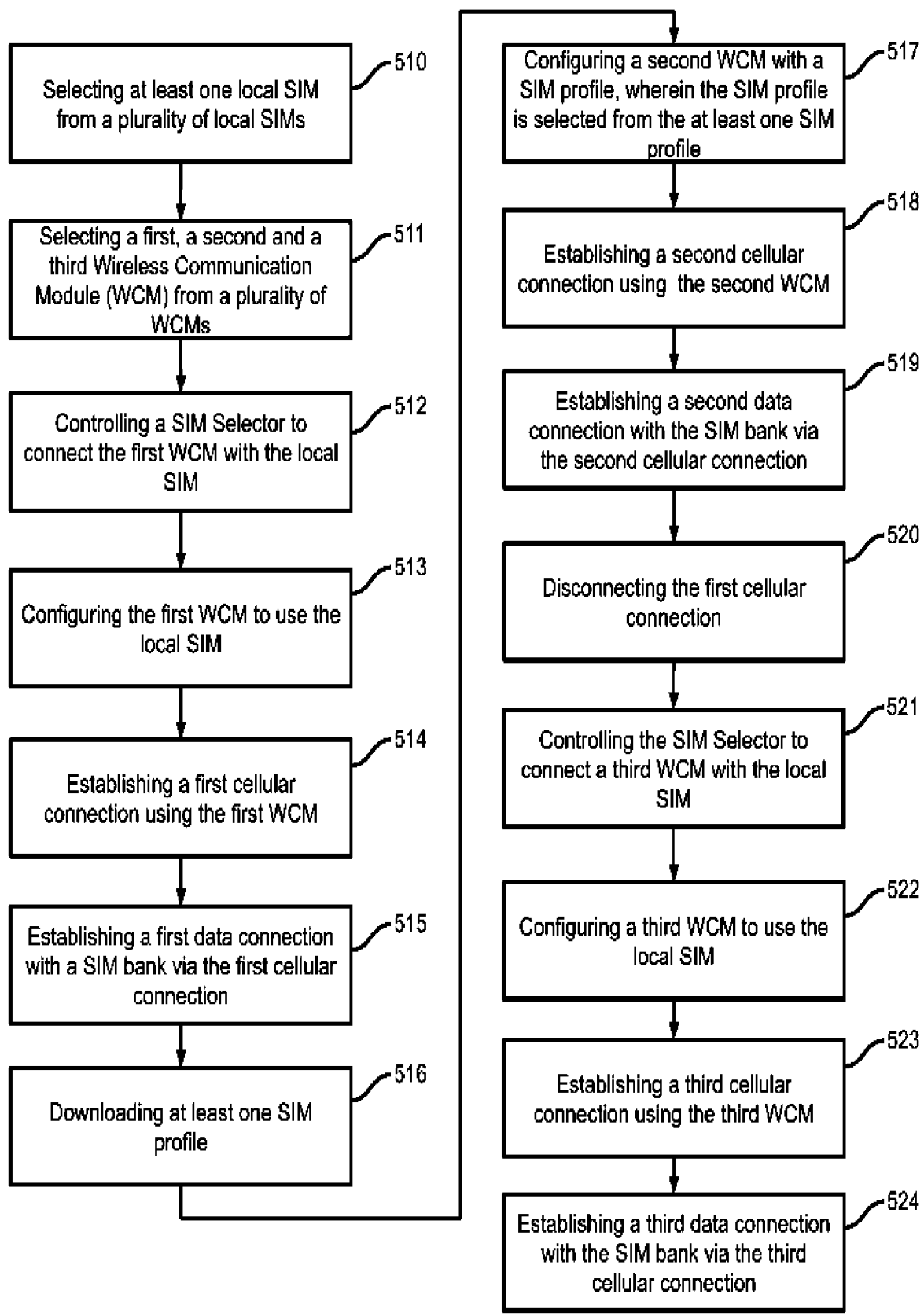
FIG. 5C is a flowchart illustrating processes of one of the embodiments of the present disclosure.

In one variant, network devices 100 or 110 may comprise more than one local SIM, as illustrated in FIG. 1A and FIG. 1B. For illustrative purposes, only network device 110 with more than one local SIM is used for illustration. The local selection method illustrated in FIG. 5C is also applicable for the network device with two WCMs.

Figure 3C:
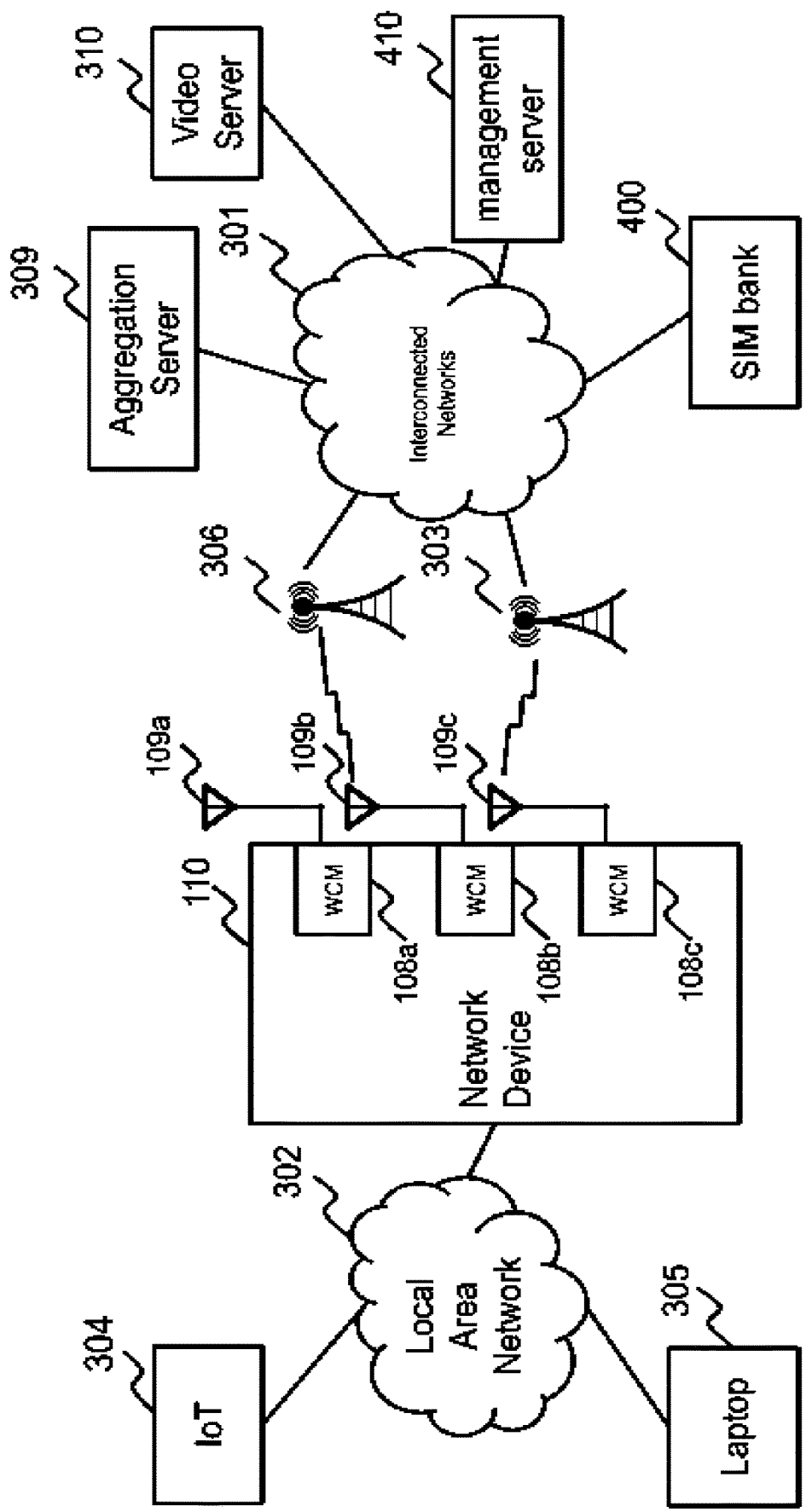
FIG. 3C is another network diagram according to the embodiments of the present disclosure.

FIG. 3C is a network diagram of an illustrative network according to the embodiments of the present invention. FIG. 3C is similar to FIG. 3B, but network device is network device 120 and not network device 110.

Figure 1C:
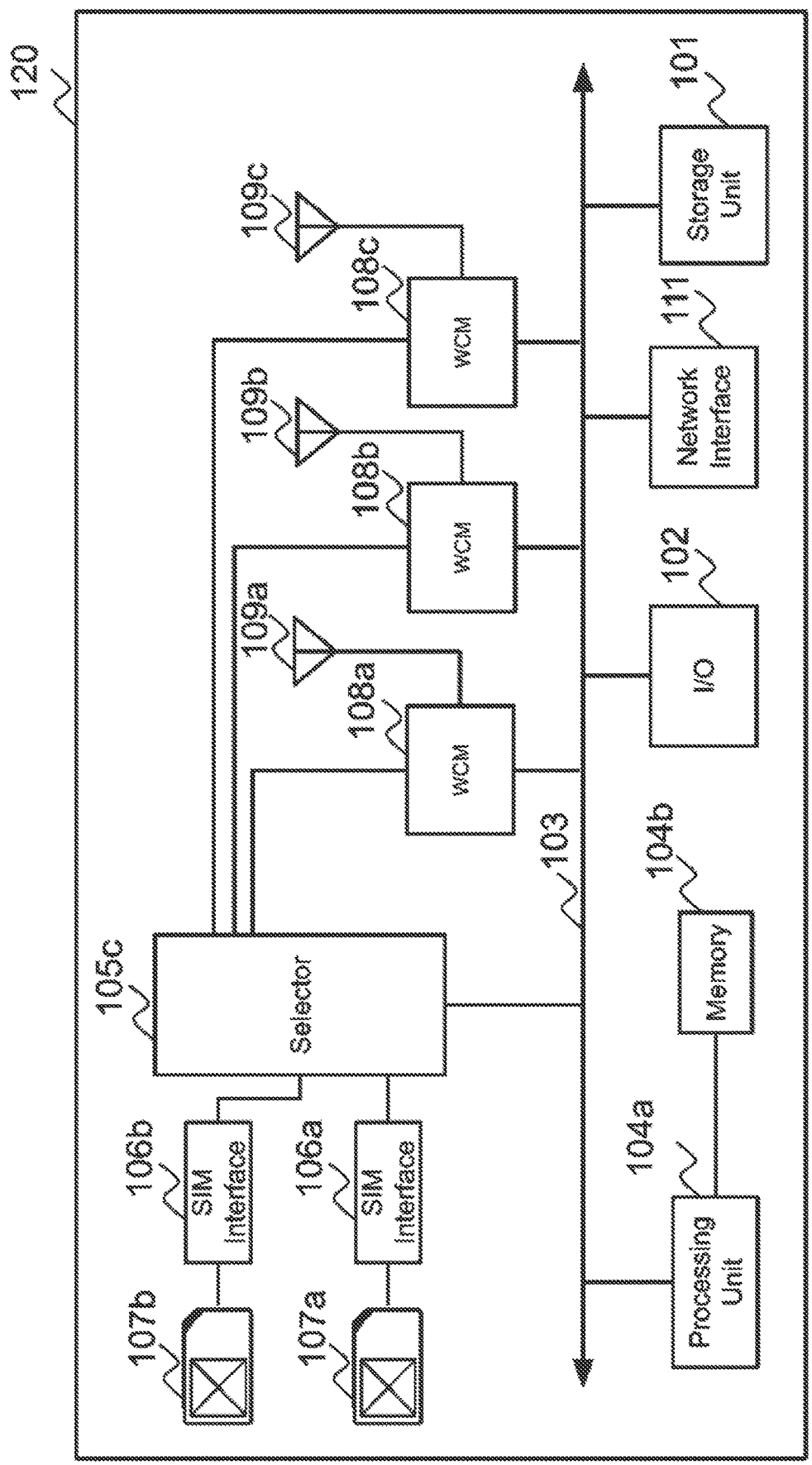
FIG. 1C is a block diagram illustrating another network device according to the embodiments of the present disclosure.

FIG. 1C is another schematic block diagram of an exemplary network device according to the embodiments of the present invention. FIG. 1C is similar to FIG. 1B, but network device 120 illustrated in FIG. 1C further comprises another local SIM interface 106*b*, and local SIM 107*b* is housed in local SIM interface 106*b*. Local SIM 107*a* may be a physical SIM card or an embedded SIM (eSIM). Also, the selector in network device 120 is selector 105*c*, not selector 105*b* in network device 110. Details of selector 105*c* will be discussed in FIG. 2C.

Figure 2C:
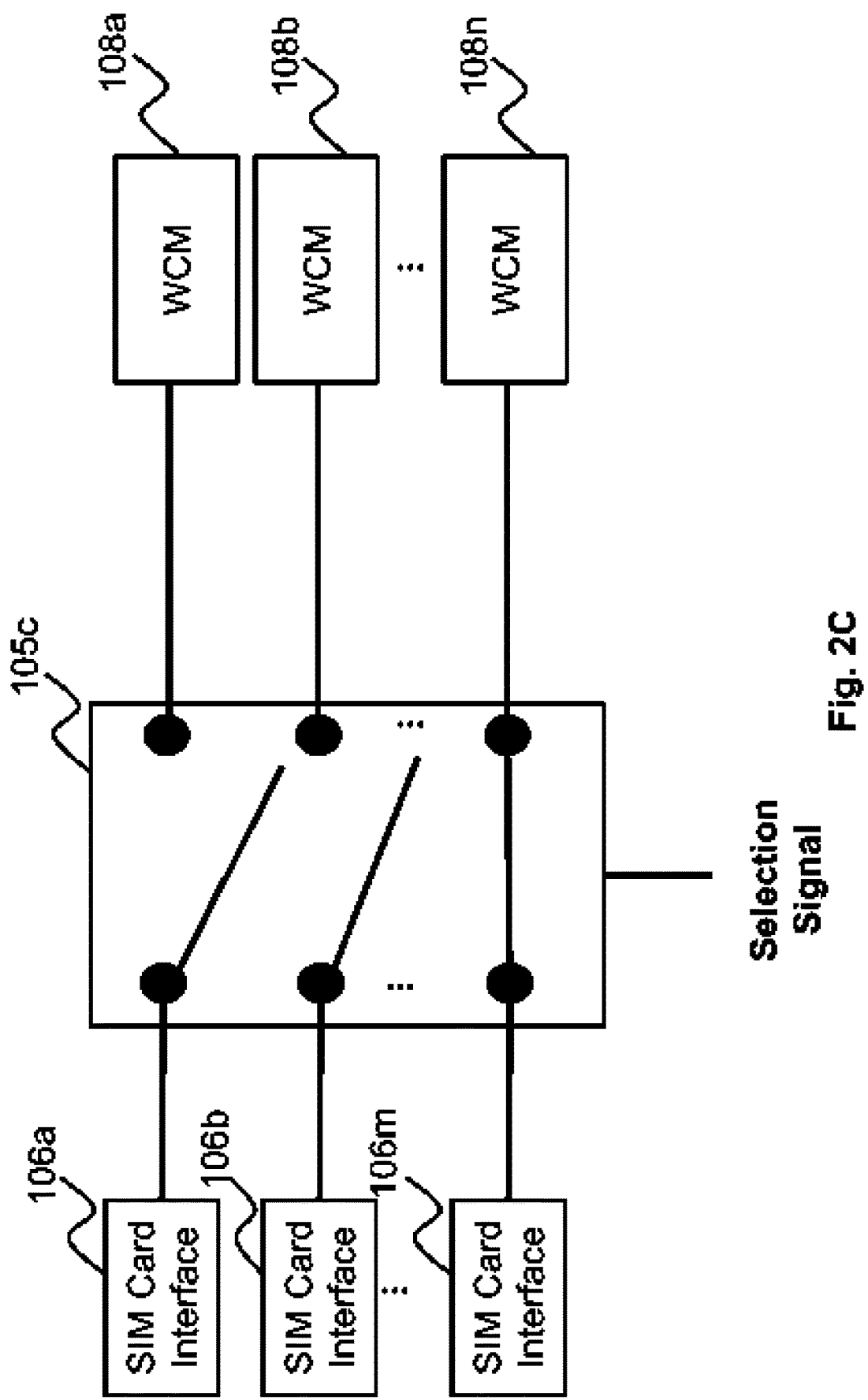
FIG. 2C is a block diagram illustrating another selector according to the embodiments of the present disclosure.

FIG. 2C is another schematic block diagram of an exemplary selector according to the embodiments of the present invention. Selector 105*c* is similar to selector 105*b* but capable of selecting at least one local SIM from a plurality of local SIMs. For each of selected local SIM, it is configured with a selected WCM, such as WCM 108a illustrated in FIG. 1C. The number of local SIMs, which may be physical SIMs or eSIMs, may be different from the number of WCMs. The more local SIMs, the more selection the processing unit may select but cost and complexity may increase. WCMs 108 are limited to use local SIMs. WCMs 108 may also use remote SIMs.

FIG. 5C illustrates another method for establishing three or more cellular connections, using more than one local SIM or a remote SIM. For illustrative purposes, three WCMs 108a-c are the WCMs coupled to or housed in network device 120. FIG. 5C should be viewed in conjunction with FIG. 1C, FIG. 2C, and FIG. 3C.

In process 510, processing unit 104a selects the at least one local SIM from the plurality of local SIMs. For example, local SIM 107a, which is housed in SIM card interface 106a, is selected for WCM 108a and local SIM 107b, which is housed in SIM card interface 106b, is further selected for WCM 108n.

The selection of the local SIM may be based on instructions manually provided by an administrator of the network device 120 or may be based on a local SIM selection policy. The local SIM selection policy may be configured by the administrator of network device 120 or retrieved from a remote server. The local SIM selection policy may be based on one or more of the following criteria: geolocation of network device 120, position of the SIM placed in network device 120, SIM category, network performance history of a SIM, identity of wireless carrier network issuing a SIM, services offered by wireless carrier network of a SIM, service quality of wireless carrier network of a SIM, administrator's preference, tariffs, remaining usage quota of available local SIMs, billing cycle information, and time.

After process 510 is performed, processes 511-524 are performed subsequently. Processes 511-524 in the method illustrated in FIG. 5C are the same as processes 511-524 illustrated in FIG. 5B.

In process 511, network device 120 selects a first WCM, a second WCM, and a third WCM from a plurality of WCMs connected to network device 120.

In process 512, processing unit 104a controls selector 105c to connect the first WCM, such as WCM 108a, with local SIM 107a.

In process 513, WCM 108a is configured to use local SIM 107a via selector 105c and local SIM interface 106a.

In process 514, processing unit 104a then instructs WCM 108a to establish a first cellular connection. The first cellular connection is established between network device 120 and a base station, such as base station 303.

In process 515, network device 120 establishes a first data connection with

SIM bank 400 via the first cellular connection.

In process 516, at least one SIM profile is downloaded from SIM bank 400 to network device 120.

In process 517, the second WCM, such as WCM 108b, is configured to use a selected SIM profile.

In process 518, WCM 108b is configured to establish a second cellular connection using the selected SIM profile.

In process 519, the second data connection is established with SIM bank 400 via the second cellular connection.

In process 520, the first cellular connection is disconnected.

In process 521, processing unit 104a controls selector 105c to connect the third WCM, such as WCM 108c, with local SIM 107a.

In one variant, instead of connecting with local SIM 107a via selector 105c and local SIM interface 106a, WCM 108c may connect with local SIM 107b via selector 105c and local SIM interface 106b.

In process 522, WCM 108c is configured to use local SIM 107a.

In one variant, WCM 108c is configured to use local SIM 107b.

In process 523, processing unit 104a then instruct WCM 108c to establish a third cellular connection.

In one variant, network device 110 may further establish a third data connection in process 524. The third data connection is established with the SIM bank via the third cellular connection.

Figure 1D:
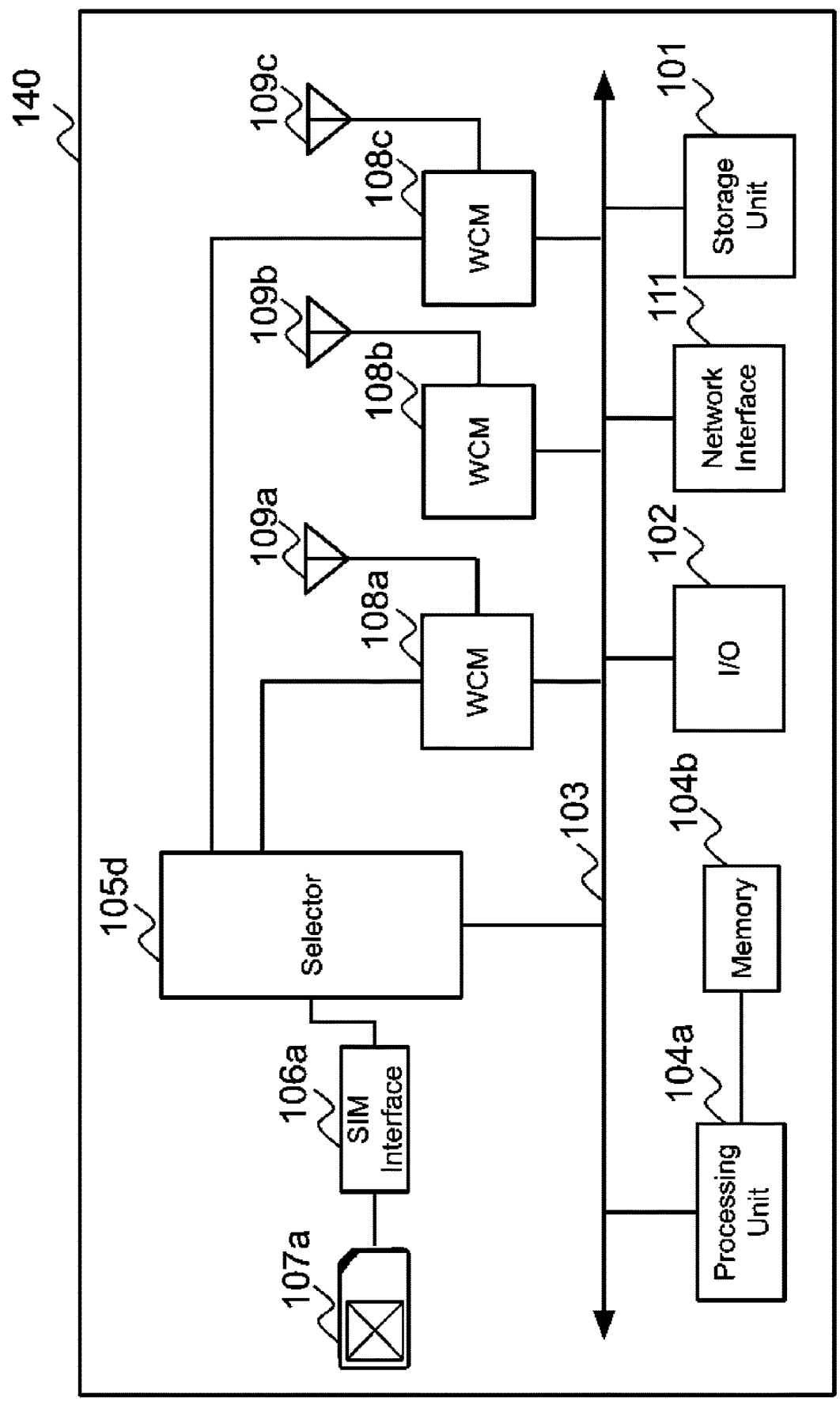
FIG. 1D is a block diagram illustrating another network device according to the embodiments of the present disclosure.
Figure 2D:
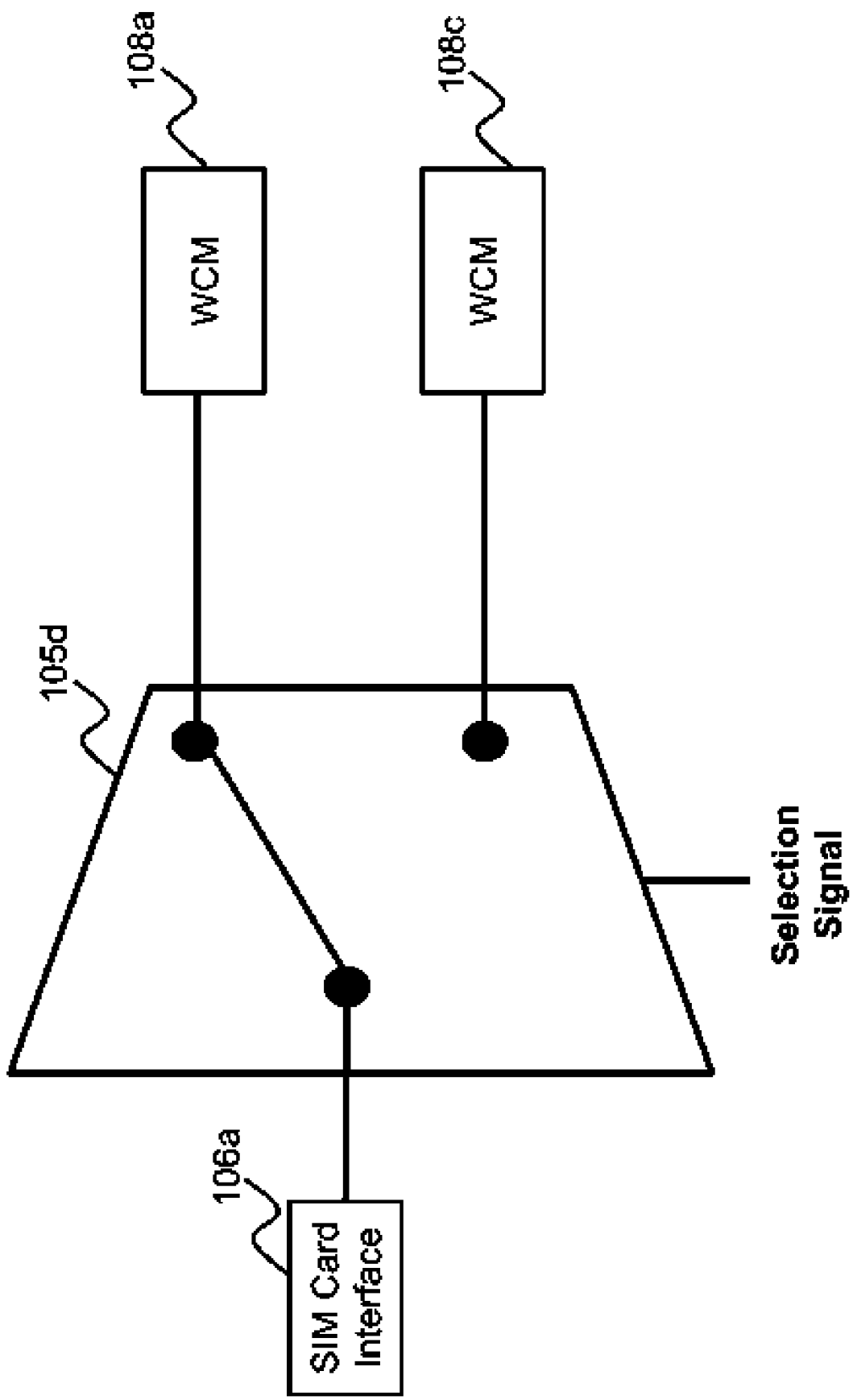
FIG. 2D is a block diagram illustrating another selector according to the embodiments of the present disclosure.

In one variant, selector 105d is used instead of selector 105c. FIG. 2D is another schematic block diagram of an exemplary selector according to the embodiments of the present invention. Selector 105c is housed in network device 140. Details of network device 140 is illustrated in FIG. 1D.

Compared to FIG. 2C, selector 105c is replaced by selector 105d and WCM 108b is connected to selector 105d. Compared to selector 105c, only WCM 108a and 108c are connected to selector 105. As illustrated in FIG. 1D and FIG. 2D, other WCMs are connected to processing unit 104a directly, through a bus or through another multiplexer. Therefore, local SIM interface 106a is only used by WCMs 108a or WCM 108c. WCM 108b uses a remote SIM when establishing and maintaining a cellular connection.

Aggregated Data Connection

FIG. 3D is another network diagram according to the embodiments of the present invention. The network includes network device 110 with WCMs 108a, 108b, and 108c, SIM bank 400, management server 410, and aggregation server 309. Network device 110 has a plurality of WCMs 109a-c which may establish cellular connections to the same base station or to different base stations. For example, WCMs 109b and 109c may connect to base station 303, or WCMs 109b and 109c may connect to base stations 306 and 303, respectively.

Network device 110 may use the established cellular connections as WAN connections. Network device 110 is also connected to IoT device 304 and laptop 305 through LAN 302. Aggregation server 309, video server 310, and SIM bank 400 are reachable via interconnected networks 301.

Network device 110 may retrieve SIM profiles from SIM bank 400 and configure WCMs 108a-c to establish cellular connections to base stations 303 and 306 as illustrated in processes 511-523. Aggregation server 309 may be located remotely to network device 110. Network device 110 may establish an aggregated data connection with aggregation server 309 through interconnected networks 301 and the two cellular connections established. IoT device 304 and laptop 305 may request aggregation server 309 to retrieve data from and send data to other hosts reachable via interconnected networks 301 such as video server 310. The data may be received and sent through network device 110 and the aggregation connection between network device 110 and aggregation server 309. Aggregation server 309 may retrieve data from and send data to other hosts reachable via interconnected networks 301 such as video server 310.

There is no limit on the type of aggregated data connection. For example, the aggregated data connection may be implemented using a plurality of secure tunnels. Then the aggregated data connections may be used as a VPN between network device 110 and aggregated server 309.

In one example, aggregation server 309 performs as a proxy server for network device 110. Network device 110 may establish two IPSec connections with aggregation server 309, and the two IPSec connections are aggregated together to form an aggregated data connection. When laptop 305 accesses a video from video server 310, the request of the video from laptop 305 to video server 310 and the video content streamed from video server 310 to laptop 305 are carried via the aggregated data connection and data connections between aggregated server 309 and video server 310.

In another example, aggregation server 309 may be implemented using FusionHub™, which is developed by Peplink™. Network device 110 may establish an aggregated virtual private network (VPN) with aggregation server 309.

There is no limitation that aggregation server 309 must send data to and retrieve data from video server 310. In another example, network device 110 may establish a fourth data connection, via aggregation server 309, with SIM bank 400 regardless if the second and third data connections established in process 519 and 524 respectively, are maintained. This allows for higher reliability. Even if one of the two cellular connections is broken, network device 110 may still have the fourth data connection to communicate with SIM bank 400.

In one variant, network device 110 establishes an aggregated data connection with SIM bank 400 without using an aggregated server. The aggregated data connection is established using the second cellular connection and the third cellular connection established in process 518 and 523, respectively. The processing unit of network device 110 may then communicate with SIM bank 400 through the aggregated data connection. For example, authentication requests and SRES could be sent and received via the aggregated connection.

The invention claimed is:

1. A method performed at a network device for sending data to and receiving data from a cellular network, the method comprising:
   a. establishing a first cellular connection by using a first wireless communication module (WCM) and a local Subscriber Identification Module (SIM);
   b. establishing a first data connection with a SIM bank via the first cellular connection;
   c. downloading a SIM profile of a remote SIM from the SIM bank;
   d. establishing a second cellular connection by using a second WCM and the SIM profile;
   e. establishing a second data connection with the SIM bank via the second cellular connection;
   f. disconnecting the first cellular connection; and
   g. establishing a third cellular connection by using a third WCM and the local SIM;
   wherein;
   the local SIM is housed in a local SIM interface or is an embedded SIM;
   the second cellular connection and the third cellular connection are aggregated to establish an aggregated data connection with an aggregation server; and
   the network device is configured to establish a third data connection with the SIM bank via the aggregated data connection.

2. The method of claim 1, wherein the local SIM is selected from a plurality of local SIMs before the first cellular connection is established.

3. The method of claim 1, wherein the first WCM and the third WCM are connected to the local SIM via a selector.

4. The method of claim 3, wherein the selector is controlled by a processing unit of the network device.

5. The method of claim 3, wherein the selector is implemented by a multiplexer.

6. The method of claim 1, wherein the SIM bank is managed by a SIM bank management server.

7. The method of claim 1, wherein the SIM bank is located remotely.

8. The method of claim 1, wherein the remote SIM is selected by a remote SIM selection policy.

9. The method of claim 8, wherein the remote SIM selection policy is based on at least one of: a geolocation of the network device, a position of a SIM placed in the network device, SIM category, network performance history of a SIM, an identity of a wireless carrier network issuing a SIM, services offered by a wireless carrier network of a SIM, service quality of a wireless carrier network of a SIM, administrator's preference, tariffs, remaining usage quota of available local SIMs, billing cycle information, and a time.

10. A method performed at a network device for sending data to and receiving data from a cellular network, the method comprising:
    a. establishing a first cellular connection by using a first wireless communication module (WCM) and a local Subscriber Identification Module (SIM);
    b. establishing a first data connection with a SIM bank located remotely via the first cellular connection;
    c. downloading a SIM profile of a remote SIM from the SIM bank;
    d. establishing a second cellular connection by using a second WCM and the SIM profile;
    e. establishing a second data connection with the SIM bank via the second cellular connection;
    f. disconnecting the first cellular connection;
    g. establishing a third cellular connection by using a third WCM and the local SIM; h. establishing an aggregated data connection with an aggregation server using the second cellular connection and the third cellular connection; and
    i. establishing a third data connection with the SIM bank via the aggregated data connection;
    wherein:
    the local SIM is housed in a local SIM interface or is an embedded SIM; and
    the first WCM and the third WCM are connected to the local SIM via a selector implemented by a multiplexer.

11. The method of claim 10, wherein the remote SIM is selected by a remote SIM selection policy.

12. A network device, comprising:
    at least one processing unit;
    at least one main memory;
    at least one logic circuit to enable multiplexing;
    a plurality of wireless communication modules (WCMs);
    at least one network interface;
    at least one Subscriber Identification Module (SIM) interface; and
    at least one storage medium comprising program instructions executable by the at least one processing unit for:
    a. establishing a first cellular connection by using a first WCM and a local SIM;
    b. establishing a first data connection with a SIM bank via the first cellular connection;
    c. downloading a SIM profile of a remote SIM from the SIM bank;
    d. establishing a second cellular connection by using a second WCM and the SIM profile;

e. establishing a second data connection with the SIM bank via the second cellular connection;
f. disconnecting the first cellular connection; and
g. establishing a third cellular connection by using a third WCM and the local SIM;

wherein;
the local SIM is housed in a local SIM interface or is an embedded SIM;
the second cellular connection and the third cellular connection are aggregated to establish an aggregated data connection with an aggregation server; and
the network device is configured to establish a third data connection with the SIM bank via the aggregated data connection.

13. The network device of claim 12, wherein the local SIM is selected from a plurality of local SIMs before the first cellular connection is established.

14. The network device of claim 13, wherein the first WCM and the third WCM are connected to the local SIM via a selector.

15. The network device of claim 14, wherein the selector is controlled by the at least one processing unit.

16. The network device of claim 13, wherein the selector is implemented by a multiplexer.

17. The network device of claim 13, wherein the SIM bank is managed by a SIM bank management server.

18. The network device of claim 17, wherein the SIM bank is located remotely.

19. The network device of claim 17, wherein the remote SIM is selected by a remote SIM selection policy.

20. The network device of claim 19, wherein the remote SIM selection policy is based on at least one of: a geolocation of the network device, a position of a SIM placed in the network device, SIM category, network performance history of a SIM, an identity of a wireless carrier network issuing a SIM, services offered by a wireless carrier network of a SIM, service quality of a wireless carrier network of a SIM, administrator's preference, tariffs, remaining usage quota of available local SIMs, billing cycle information, and a time.

* * * * *